(12) United States Patent
Wang et al.

(10) Patent No.: US 7,806,955 B2
(45) Date of Patent: Oct. 5, 2010

(54) GAS-LIQUID SEPARATION SYSTEM AND METHOD THEREOF

(75) Inventors: Chia Chun Wang, Taipei County (TW); Fei Chih Yang, Taipei (TW)

(73) Assignee: Inotera Memories, Inc., Taoyuan County (TW)

( * ) Notice: Subject to any disclaimer, the term of this patent is extended or adjusted under 35 U.S.C. 154(b) by 71 days.

(21) Appl. No.: 12/235,901

(22) Filed: Sep. 23, 2008

(65) Prior Publication Data

US 2010/0025340 A1 Feb. 4, 2010

(30) Foreign Application Priority Data

Aug. 4, 2008 (TW) ............... 97129497 A

(51) Int. Cl.
*B01D 19/00* (2006.01)
(52) U.S. Cl. .............. 55/466; 55/461; 55/319; 95/241; 95/260; 96/55; 96/204; 4/679; 137/247.41; 137/247.51; 210/188; 210/532.1; 210/538
(58) Field of Classification Search .......... 55/461, 55/319; 95/241, 260; 96/55, 204; 210/188, 210/532.1, 538–540; 137/247.41, 247.43, 137/247.45, 247.47, 247.49, 247.51; 285/134.1, 285/135.1–135.5; 4/679
See application file for complete search history.

(56) References Cited

U.S. PATENT DOCUMENTS

| | | | | |
|---|---|---|---|---|
| 1,989,608 A * | 1/1935 | Reed | ........................ | 166/75.13 |
| 3,338,413 A * | 8/1967 | Boettcher | ................... | 210/86 |
| 5,232,475 A * | 8/1993 | Jepson | ........................ | 95/260 |
| 6,444,001 B1 * | 9/2002 | Sheffield | ..................... | 55/342 |
| 6,543,470 B2 * | 4/2003 | Mans | .................... | 137/247.19 |
| 6,845,527 B1 * | 1/2005 | Kohn | .......................... | 4/679 |
| 7,004,508 B1 * | 2/2006 | Flynn et al. | ................ | 285/134.1 |
| 2002/0062736 A1 * | 5/2002 | Field et al. | .................... | 95/241 |
| 2003/0163869 A1 * | 9/2003 | Bosch | ............................ | 4/679 |
| 2006/0156467 A1 * | 7/2006 | Mellon | .......................... | 4/679 |
| 2007/0138788 A1 * | 6/2007 | Argo et al. | ................ | 285/134.1 |
| 2008/0148477 A1 * | 6/2008 | Shafik | ............................ | 4/679 |

\* cited by examiner

*Primary Examiner*—Jason M Greene
*Assistant Examiner*—Dung Bui
(74) *Attorney, Agent, or Firm*—Rosenberg, Klein & Lee

(57) ABSTRACT

A gas-liquid separation system and a method thereof are disclosed. The said system comprises a gas-liquid separation conduit and a drain pipe. The drain pipe is curled and one side of the drain pipe connects to the gas-liquid separation conduit and the other side connects to a sewage pipe. According to the U-Tube principle, the gas and the liquid which both are exhausted by a machinery can be separated in the said system and therefore the said system can prevent related processes causing exhaust piping jam.

7 Claims, 6 Drawing Sheets

GAS-LIQUID SEPARATION SYSTEM AND METHOD THEREOF

BACKGROUND OF THE INVENTION

1. Field of the Invention

The present invention is related to improvements on exhaust pipes; in particular, to a gas-liquid separation system and a method for gas-liquid separation, for preventing reactions of exhaust gas and waste liquid that may cause pipe congestion due to crystallization.

2. Description of Related Art

The exhaust gas and waste water released from current semiconductor processes are of acidity or alkalinity. For a general oven-pipe process (e.g. low-pressure chemical vapor deposition process; LPCVD process), during the process, the semiconductor substrate is placed in a LPCVD machinery for execution of required reactions, allowing a thin film to form there on the semiconductor substrate.

$NH_4Cl$ by-product is generated in a process of wet oxidation of silicon and nitride for forming a thin layer of silicon nitride on a semiconductor substrate in a LPCVD machinery, which $NH_4Cl$ being generated in the form of vapor and exhausted through the LPCVD machinery (as shown); however, when upon exhaustion of such a $NH_4Cl$ by-product to a pipe 1a (as shown in FIG. 1), wherein the arrow of dotted line indicates gas and the arrow of solid line indicates liquid, since the temperature of the pipe 1a is lower than the $NH_4Cl$, thus liquid may be formed therein from vapor; furthermore the pipe 1a is not constructed in the form of a straight line, but having multiple turns 2a. As a result, the aforementioned two factors may let $NH_4Cl$ crystallize inside these turns 2a of the pipe 1a, resulting in jamming of $NH_4Cl$ crystals in the pipe 1a (as shown in FIGS. 2 and 3), which makes $NH_4Cl$ fail to be successfully exhausted and causes pressure surge due to reduced space, thus negatively affecting the control over entire process pressure and leading to machinery shutdown. In order to re-run the machinery (not shown), engineers need to dissemble the pipe 1a to remove the $NH_4Cl$ crystals, thus significantly consuming valuable cost and time which is becoming a critical issue required to be addressed.

Accordingly, the inventors of the present invention have considered the above-mentioned improvable defects, and, based on long-term professional experiences, together with thorough researches and observations, in conjunction with applications of fundamental theories, thus proposed the present invention having reasonable design and effectiveness in amelioration of the aforementioned disadvantages.

SUMMARY OF THE INVENTION

The objective of the present invention is to provide a gas-liquid separation system and a method for gas-liquid separation, which, through the pipeline structure of gas-liquid separation and the use thereof, enables separation of exhaust gas and waste water, preventing reactions of exhaust gas and waste water that may cause pipe congestion due to crystallization, leading to significant pressure change in the pipes and abnormality in relevant equipments, finally adversely affecting the yield.

According to the aforementioned objectives, the present invention proposes a gas-liquid separation system, comprising: a gas-liquid separation conduit; and a drain pipe, in which the drain pipe bends as U-tubes, one end of the drain pipe is connected to one end of the gas-liquid separation conduit, and the other end of the drain pipe is connected to a waste water process pipe.

Preferably, the gas-liquid separation conduit is of T-shaped, in which the gas-liquid separation conduit has a gas-liquid inlet, a gas outlet, and a liquid outlet, and the gas-liquid inlet, gas outlet, and liquid outlet are respectively located at three ends of the gas-liquid separation conduit.

Preferably, the drain pipe has a pipe body, a water inlet, and a water outlet, in which the water inlet and the water outlet are respectively installed at the two ends of the pipe body, and the pipe body further bends in 360 degrees, allowing the water inlet and the water outlet to face each other in 180 degrees. The present invention alternatively proposes a gas-liquid separation system, comprising: a gas-liquid separation conduit; a valve component, wherein one end of the valve component is connected to the gas-liquid separation conduit; and a drain pipe, in which the drain pipe bends as U-tubes, and one end of the drain pipe is connected to the other end of the valve component, and the other end of the drain pipe is connected to a waste water process pipe.

Preferably, the drain pipe bends in 360 degrees and presents a nearly circular shape.

The present invention proposes a gas-liquid separation method for a gas-liquid separation system, wherein the gas-liquid separation system comprises a gas-liquid separation conduit and a drain pipe; herein the gas-liquid separation conduit is T-shaped, and one end thereof is connected to a machinery, the other end is connected to a gas exhaust pipe, the remaining end is connected to one end of the drain pipe, while the other end of the drain pipe is connected to a waste water process pipe. The gas-liquid separation method for the gas-liquid separation system comprises the following steps: (A) guiding the exhaust gas and waste water of the machinery to the gas-liquid separation conduit; (B) allowing the waste water to flow along the gas-liquid separation conduit and to be temporarily stored in the drain pipe, while the temporarily stored waste water blocks the drain pipe to prevent the exhaust gas from passing through the drain pipe; (C) furthermore, the blocking of the exhaust gas enables gas exhaustion to veer via a gas exhaust pipe to achieve gas-liquid separation; (D) upon accumulation of the waste water reaching to a certain amount, allowing the temporarily stored waste water to start flowing into the waste water process pipe coupled to the drain pipe.

Accordingly, the gas-liquid separation system and a method thereof of the present invention provide the following beneficial effects:

1. the gas-liquid separation system according to the present invention performs gas-liquid separation by means of structure design, preventing crystallization in the pipes which may cause congestion therein;

2. the gas-liquid separation method for the gas-liquid separation system according to the present invention employs U-tube principle to use waste water as a gate (i.e. blocking means) for preventing exhaust gas from passing through;

3. seeing that the gas-liquid separation system according to the present invention may achieve the purpose of gas-liquid separation, exhaust gas and waste liquid do not interact, thus avoiding creation of crystals, facilitating long-term clearance in pipes;

4. Preventing generation of crystallization, thus eliminating possibility of significant pressure change which may undesirably lead to automatic machinery shutdown.

In order to further understand the techniques, methods, and effects taken by the present invention to achieve the prescribed objectives, references are made to the subsequent detailed descriptions and append drawings related to the present invention, and it is believed that the objectives, characteristics, and features of the present invention can be thereby thoroughly and concretely appreciated. However, the appended diagrams hereunder are provided simply for the purpose of reference and illustration, rather than being used to restrict the scope of the present invention.

DETAILED DESCRIPTION OF PREFERRED EMBODIMENTS

Figure 1:
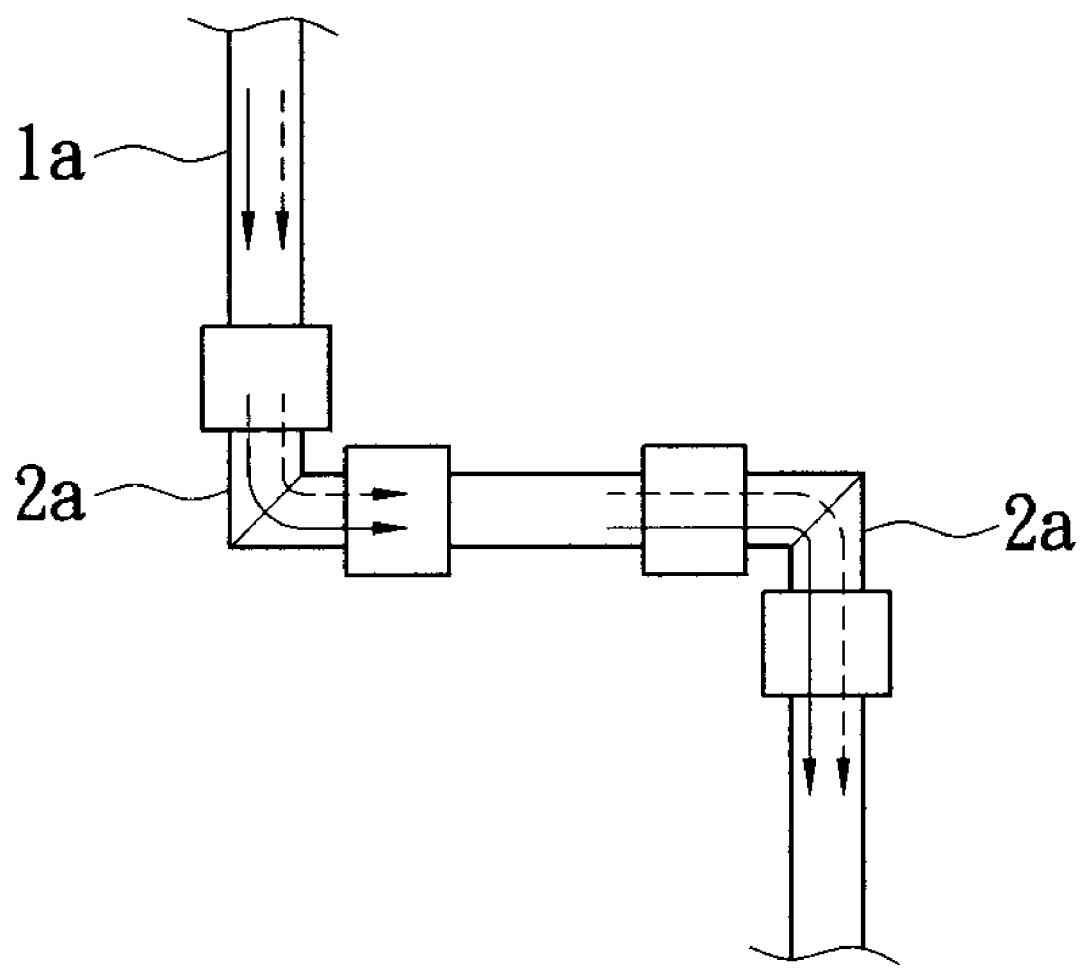
FIG. 1 is a schematic structural diagram of a prior art exhaust pipe system.
Figure 2:
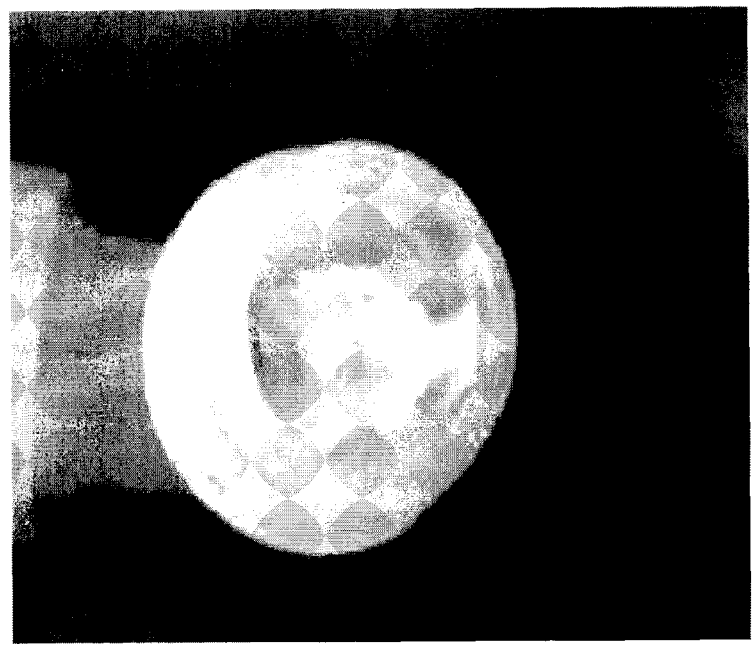
FIG. 2 is a picture of crystallization form in a pipe of the prior art exhaust pipe system.
Figure 3:
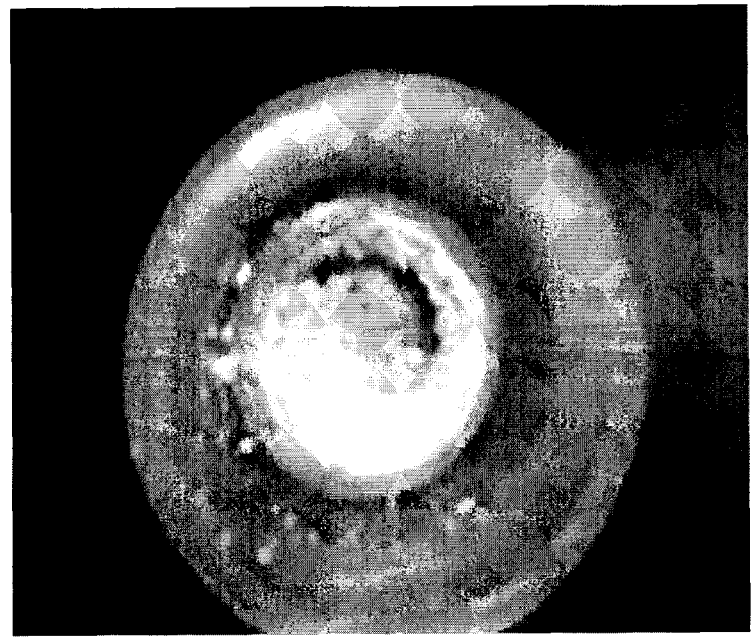
FIG. 3 is a picture of pipeline congestion caused by crystallization of the prior art exhaust pipe system.
Figure 4:
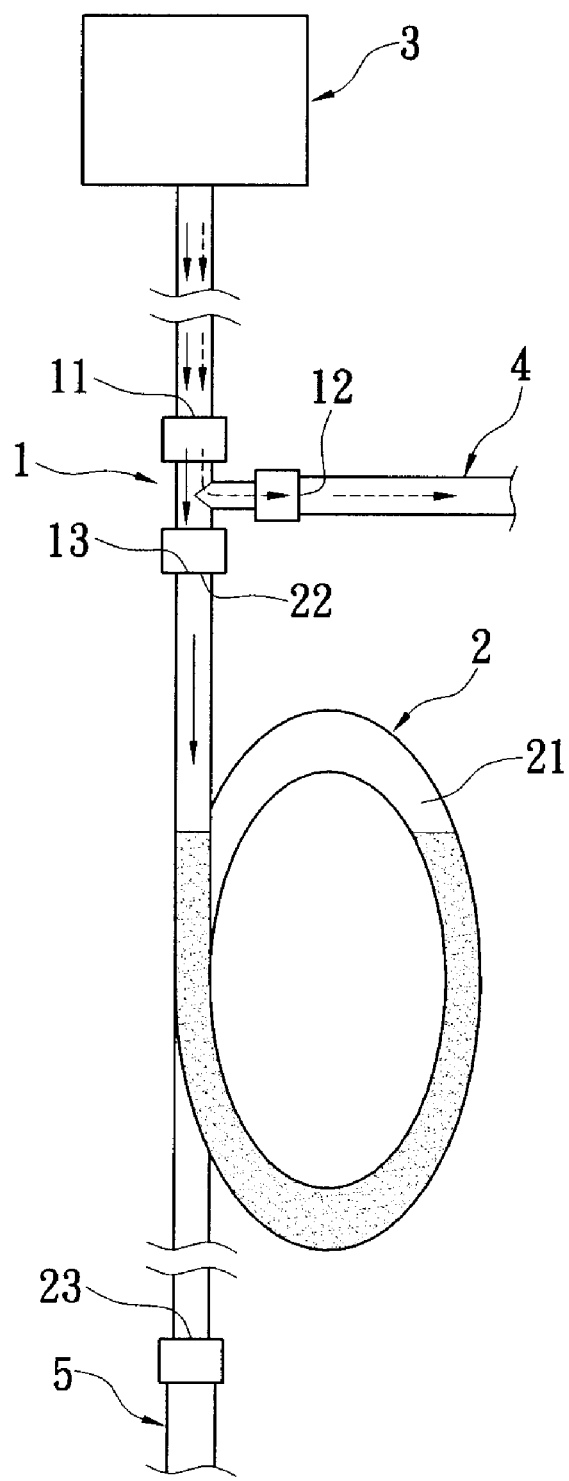
FIG. 4 is a schematic diagram of a gas-liquid separation system according to the present invention.

Referring now to FIG. 4, a gas-liquid separation system according to the present invention comprises a gas-liquid separation conduit 1 and a drain pipe 2 connected to the gas-liquid separation conduit 1, wherein the gas-liquid separation conduit 1 is a T-shaped pipe, and the gas-liquid separation conduit 1 is further connected to a machinery 3 and a gas exhaust pipe 4, while the drain pipe 2 is further connected to an waste water process pipe 5. It should be noted that the number of the machinery 3 can be plural, and the plurality of machineries 3 may be jointly connected to the gas-liquid separation conduit 1. In the present embodiment, only one machinery 3 is shown.

The gas-liquid separation conduit 1 has a gas-liquid inlet 11, a gas outlet 12, and a liquid outlet 13, and the gas-liquid inlet 11, gas outlet 12, and liquid outlet 13 are respectively installed at three ends of the gas-liquid separation conduit 1, in which the gas-liquid inlet 11 is further connected to the machinery 3, thereby allowing the exhaust gas and waste water from the machinery 3 to enter into the gas-liquid separation conduit 1 via the gas-liquid inlet 11 for gas-liquid separation; the gas outlet 12 is connected to the gas exhaust pipe 4, and the liquid outlet 13 is connected to the drain pipe 2. It should be noted that the solid line arrow indicates waste water, and dotted line arrow indicates exhaust gas.

The drain pipe 2 further consists of a pipe body 21, a water inlet 22, and a water outlet 23, in which the two ends of the pipe body 21 are respectively installed with the water inlet 22 and the water outlet 23, and the pipe body 21 bends in 360 degrees and presents a nearly circular shape, allowing the water inlet 22 to be connected to the liquid outlet 13; the water outlet 23 is connected to the waste water process pipe 5, allowing the water inlet 22 and the water outlet 23 to face each other at 180 degrees in an upside-down vertical fashion.

By means of aforementioned design, exhaust gas can be guided into the gas exhaust pipe 4 through the gas outlet 12 of the gas-liquid separation conduit 1, while waste water flows into the pipe body 21 through the water inlet 22 from the liquid outlet 13 of the gas-liquid separation conduit 1, then entering into the waste water process pipe 5 via the water outlet 23. It should be noted that the suitable materials for the gas-liquid separation conduit 1 and the drain pipe 2 may be plastic materials, such as Teflon, thus it is possible to prevent damage to the gas-liquid separation conduit 1 and the drain pipe 2, in case that the exhaust gas and/or waste liquid are corrosive materials.

Figure 5:
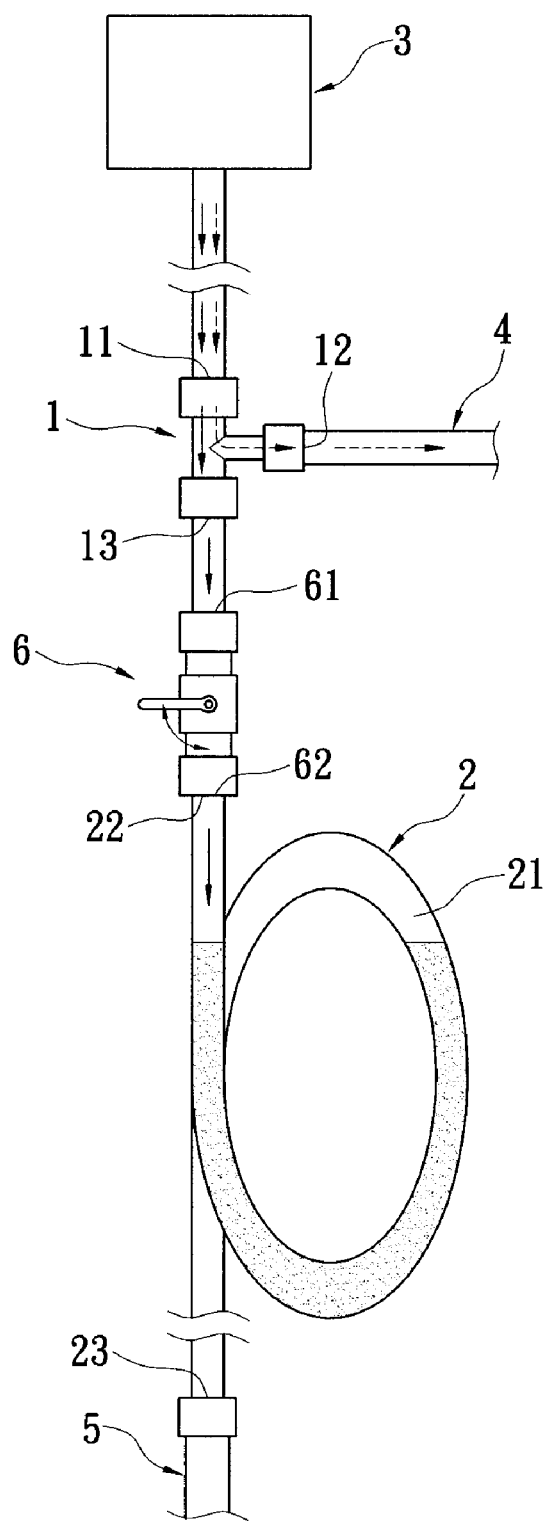
FIG. 5 is another schematic diagram of the gas-liquid separation system according to the present invention.

Furthermore, refer to FIG. 5, to facilitate convenient cleanup of the gas exhaust pipe 4, it is possible to further place a valve component 6 between the gas-liquid separation conduit 1 and the drain pipe 2, wherein the valve component 6 has an inlet 61 and an outlet 62, and the two sides thereof are respectively installed with the inlet 61 and the outlet 62; herein the inlet 61 is connected to the liquid outlet 13 of the gas-liquid separation conduit 1, and the outlet 62 connected to the water inlet 22 of the drain pipe 2. When it is required to clean up the gas exhaust pipe 4, users need only to shut down the valve component 6 and let cleaning liquid (not shown) to flow into the gas-liquid separation conduit 1 by way of the gas-liquid inlet 11; due to blockage of the valve component 6, the cleaning liquid (not shown) turns to enter into the gas exhaust pipe 4, thereby washing off and removing contaminants attached on the interior sidewalls of the gas exhaust pipe 4.

Figure 6:
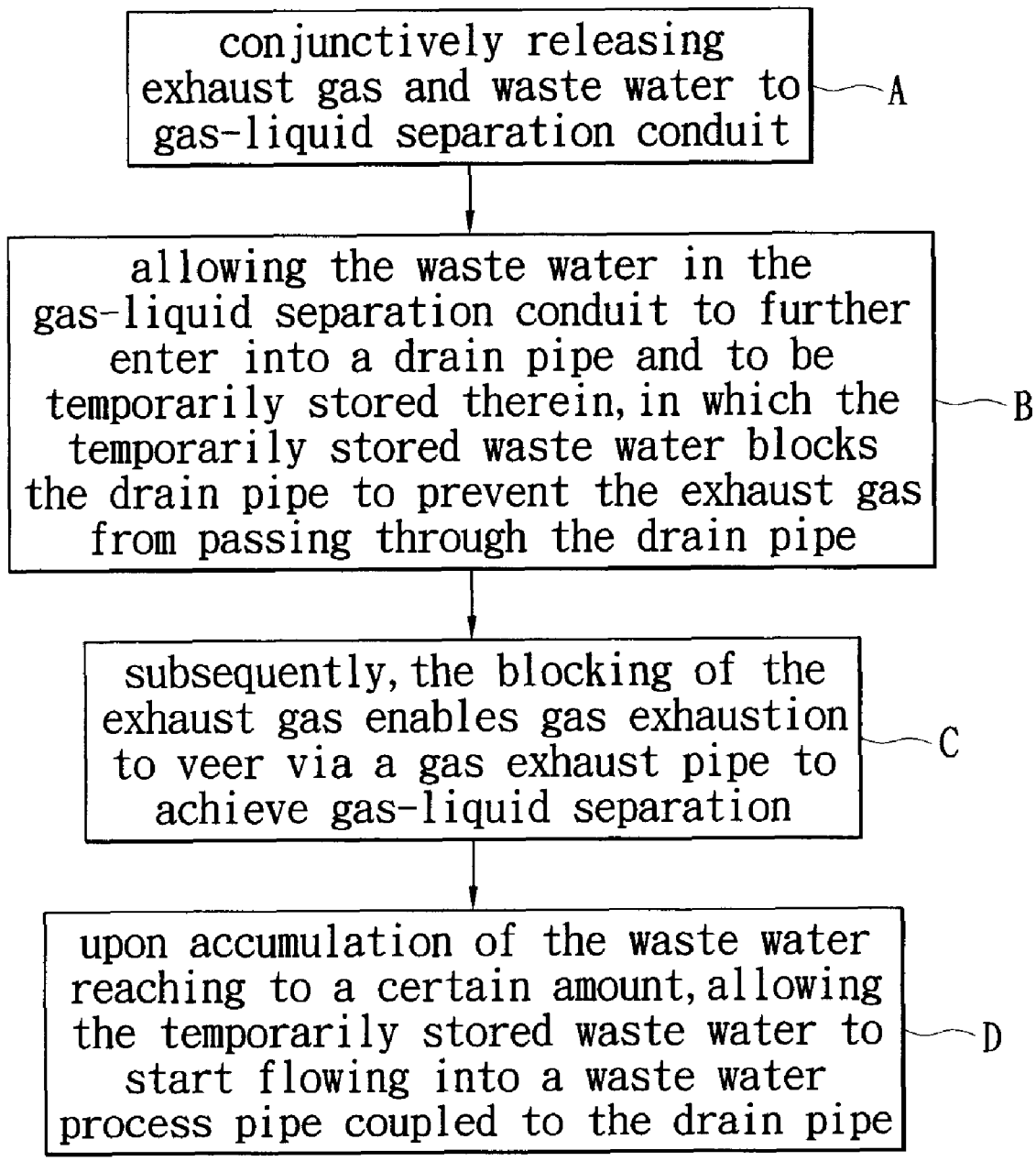
FIG. 6 is a flowchart of a gas-liquid separation method for a gas-liquid separation system according to the present invention.

Refer now to FIG. 6, the present invention provides a gas-liquid separation method for a gas-liquid separation system, comprising the following steps:

(A) guiding the exhaust gas and waste water of the machinery 3 (please view FIG. 6 in conjunction with FIG. 4) to the gas-liquid separation conduit 1;

(B) allowing the waste water flowing in the gas-liquid separation conduit 1 to further enter into the drain pipe 2 and to be temporarily stored in the drain pipe 2, while the temporarily stored waste water blocks the drain pipe 2 thus acting as a gate to prevent the exhaust gas released by the machinery 3 from passing through the drain pipe 2;

(C) subsequently, the blocking of the exhaust gas enables gas exhaustion to veer via the gas exhaust pipe 4 to achieve gas-liquid separation;

(D) upon accumulation of the waste water reaching a certain amount due continuous exhaustion from the machinery 3, allowing the temporarily stored waste water in the drain pipe 2 to start flowing into the waste water process pipe 5 along the drain pipe 2.

To enable better understanding and implementation of the present invention for those skilled in the art, the details of the method according to the present invention will be described at length. Referring to FIG. 6 conjunctively with FIG. 4, it is noted that the solid line arrow indicates waste water, and dotted line arrow indicates exhaust gas. Initially, the machinery 3 releases exhaust gas and waste water after completion of processes (i.e. LPCVD), and the exhaust gas and waste water are jointly emitted into the gas-liquid separation conduit 1 for further gas-liquid separation.

The waste water injected into the gas-liquid separation conduit 1 flows along the gas-liquid separation conduit 1 downward due to gravity, passing through the switch 13 of the gas-liquid separation conduit 1 and entering into the water inlet 22 of the drain pipe 2, then going to the drain pipe 2.

Figure 7B:
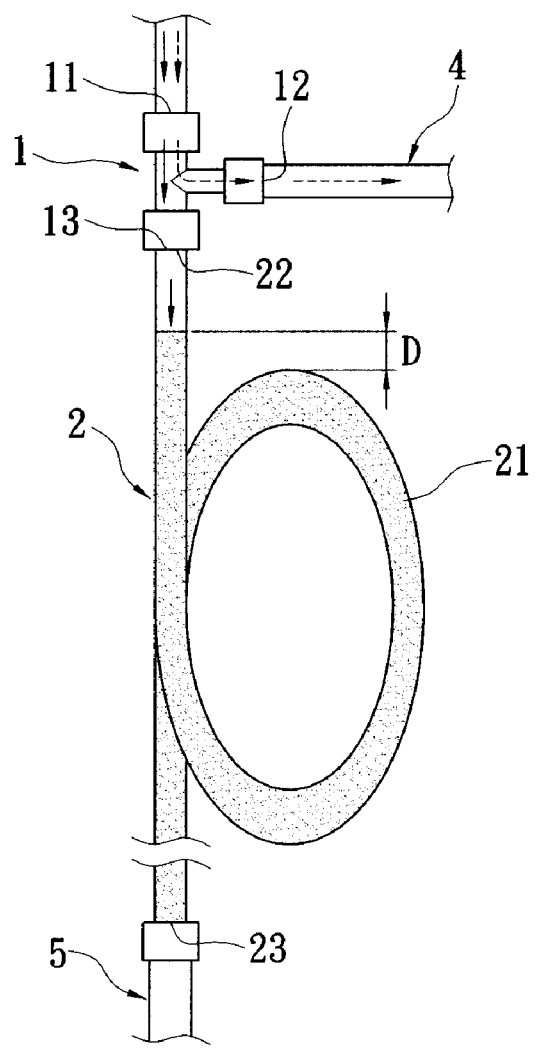
FIG. 7B is another schematic diagram for a gas-liquid separation system under service state according to the present invention.
Figure 7A:
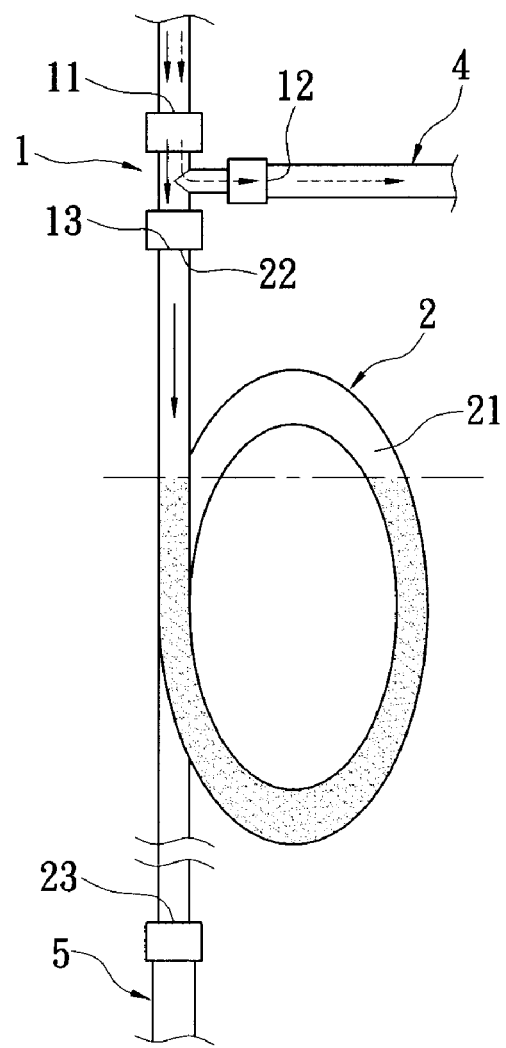
FIG. 7A is a schematic diagram for a gas-liquid separation system under service state according to the present invention.

As shown in FIG. 7A, since the drain pipe 2 presents a nearly circular shape in a 360-degree turn, waste water flowing in the drain pipe 2 will be temporarily stored in the drain pipe 2; because of U-tube principle, it allows the temporarily stored waste water to block the drain pipe 2, thus such stored waste water further acts as a gate (i.e. block means) to shut down the drain pipe 2, preventing forward movement of the exhaust gas, as a result, the exhaust gas will not enter into the drain pipe 2 but veered toward the gas outlet 12 of the gas-liquid separation conduit 1 and into the gas exhaust pipe 4, thereby achieving the objective of gas-liquid separation, preventing possible reaction between the exhaust gas and waste water to crystallize and result in undesirable pipe congestion.

Refer now to FIG. 7B, when the waste water continues to flow into the drain pipe 2 and accumulates to a certain prescribed level (previously referred to as amount), the temporarily stored waste water starts to flow; that is, when the waste water released from the machinery 3 enters into the drain pipe 2, because of the U-Tube design in the drain pipe 2, it is possible to allow the liquid surfaces of waste water temporarily stored in the drain pipe 2 to be identical (as shown in FIG. 7A), wherein the identical liquid surfaces indicating zero pressure difference; hence the waste water is still temporarily stored in the drain pipe 2, but as the machinery 3 continues to release waste water into the drain pipe 2, the liquid surface of the continuously accumulated waste water exceeds the liquid surface of the waste water temporarily stored in the drain pipe 2. At this moment, there occurs a height difference D between the two liquid surfaces, wherein the height difference D indicating the occurrence of pressure difference, and the pressure at the side with higher liquid surface is greater than the pressure on the other end with lower liquid surface, allowing the waste water to flow from higher pressure end to lower pressure end, causing the waste water temporarily stored in the drain pipe 2 to start flowing into the waste water process pipe 5. Therefore, such a prescribed extent indicates the liquid surface of the continuously accumulated waste water exceeds the liquid surface of waste water temporarily stored in the drain pipe 2; upon appearance of a difference in height, the temporarily stored waste water then starts flowing into the waste water process pipe 5 for further process.

The gas-liquid separation system and a method thereof according to the present invention provide the following beneficial effects:

1. the gas-liquid separation system according to the present invention performs gas-liquid separation by means of structure design, preventing crystallization in the pipes which may cause congestion therein;

2. the gas-liquid separation method for the gas-liquid separation system according to the present invention employs U-tube principle to use waste water as a gate (i.e. blocking means) for preventing exhaust gas from passing through;

3. seeing that the gas-liquid separation system according to the present invention may achieve the purpose of gas-liquid separation, exhaust gas and waste liquid do not interact, thus avoiding creation of crystals, facilitating long-term clearance in pipes;

4. Preventing generation of crystallization, thus eliminating possibility of significant pressure change which may undesirably lead to automatic machinery shutdown.

The drawings and detailed descriptions set forth supra simply illustrate the embodiments of the present invention. Those skilled in the art may make various changes or improvements based on the aforementioned disclosure, and all such changes or improvements are deemed to conform to the spirit of the present invention and accordingly should be included in the scope of the present invention delineated by the claimed attached hereunder.

What is claimed is:

1. A gas-liquid separation system, comprising:
   a gas-liquid separation conduit, comprising a gas-liquid inlet, a gas outlet, and a liquid outlet respectively located at three ends thereof;
   a valve component, wherein one end of the valve component is connected to the liquid outlet of the gas-liquid separation conduit for selectively forcing a liquid to flow into a gas exhaust pipe connected to the gas outlet of the gas-liquid separation conduit to flush out contaminants disposed on an inside surface of the gas exhaust pipe; and
   a drain pipe, configured substantially in a U-shaped tubular structure, and one end of the drain pipe is connected to the other end of the valve component, and the other end of the drain pipe is connected to a waste water process pipe.

2. The gas-liquid separation system according to claim 1, wherein the drain pipe turns in 360 degrees and presents a nearly circular shape.

3. The gas-liquid separation system according to claim 1, wherein the gas-liquid separation conduit comprises a substantially T-shape structure.

4. The gas-liquid separation system according to claim 3, wherein the gas-liquid inlet is connected to at least one machinery.

5. The gas-liquid separation system according to claim 3, wherein the drain pipe has a pipe body, a water inlet, and a water outlet, in which the water inlet and the water outlet are respectively installed at the two ends of the pipe body, the water inlet is connected to the other end of the valve component, and the water outlet is connected to the waste water process pipe.

6. The gas-liquid separation system according to claim 5, wherein the pipe body further bends in 360 degrees, allowing the water inlet and the water outlet to face each other in 180 degrees.

7. The gas-liquid separation system according to claim 5, wherein the valve component has an inlet and an outlet, the inlet and the outlet being respectively located at the two ends of the valve component, the inlet is connected to the liquid outlet and the outlet is connected to the water inlet.

* * * * *